United States Patent
Thompson et al.

(10) Patent No.: US 10,021,267 B2
(45) Date of Patent: Jul. 10, 2018

(54) DYNAMIC PRINT JOB PREVIEWER WITH AUTOMATIC STOCK ADJUSTMENT

(71) Applicant: Xerox Corporation, Norwalk, CT (US)

(72) Inventors: Peter M. Thompson, Manhattan Beach, CA (US); Farzin Blurfrushan, Torrance, CA (US); Alex D. Arranaga, Brea, CA (US); Bagavath Sivakumar, Nagercoil (IN); Nedunchezhiapandian Narayanan, Madurai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/357,103

(22) Filed: Nov. 21, 2016

(65) Prior Publication Data
US 2018/0146115 A1    May 24, 2018

(51) Int. Cl.
G06K 15/02    (2006.01)
G06F 3/12     (2006.01)
H04N 1/393    (2006.01)
H04N 1/00     (2006.01)

(52) U.S. Cl.
CPC ........... *H04N 1/393* (2013.01); *G06F 3/1204* (2013.01); *G06F 3/1208* (2013.01); *G06F 3/1252* (2013.01); *G06F 3/1256* (2013.01); *H04N 1/0044* (2013.01); *H04N 1/00466* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 6,995,860 B2 | 2/2006 | Roztocil et al. | |
| 8,274,719 B2 | 9/2012 | Tomomatsu | |
| 8,861,005 B2 | 10/2014 | Grosz | |
| 8,950,957 B2 | 2/2015 | Supron et al. | |
| 2007/0064288 A1* | 3/2007 | Lee | G06F 3/1205 358/527 |
| 2007/0070397 A1 | 3/2007 | Shimoichi | |
| 2007/0110493 A1 | 5/2007 | Chen | |
| 2007/0211276 A1 | 9/2007 | Toda | |
| 2007/0211296 A1 | 9/2007 | Toda | |
| 2008/0273224 A1 | 11/2008 | Maulsby et al. | |
| 2009/0059298 A1 | 3/2009 | Huenemann | |
| 2010/0067071 A1 | 3/2010 | Rozenfeld et al. | |
| 2012/0314228 A1* | 12/2012 | Kobayashi | G06F 3/1208 358/1.2 |

* cited by examiner

Primary Examiner — Dov Popovici
(74) Attorney, Agent, or Firm — Gibb & Riley, LLC (57) ABSTRACT

A display includes a preview image of a printable item, as the printable item would appear in printed form. A user input component detects a user resizing the preview image to identify an updated size of the preview image. A processor automatically matches the updated size of the preview image to sizes of print media available to the printing device, to thereby identify a selected print media supply for use with printing the printable item. The processor also automatically matches the updated size of the preview image to orientations the printing device is capable of printing, to thereby identify a selected printing orientation for use with printing the printable item. The display automatically sets a print media choice option to the selected print media supply, and sets an orientation choice option to the selected printing orientation, in response to the user resizing the preview image.

15 Claims, 7 Drawing Sheets

DYNAMIC PRINT JOB PREVIEWER WITH AUTOMATIC STOCK ADJUSTMENT

BACKGROUND

Systems and methods herein generally relate to resizing a print job through a print menu option.

When operating a printing menu, a customer can preview the print job, and may decide that the print job should be resized. During such resizing operations, the user is required to manually adjust stock size and stock orientation options, followed by trial and error adjustments of such elements, in an attempt to improve the resized output.

SUMMARY

Various methods herein display a "printing" menu on a display device of a printing device. The display device includes a user input component, and the printing menu includes a "preview menu" option and a "print" option. In response to the preview menu option being selected by the user through the user input component, these methods display a "preview" electronic display on the display device. The preview electronic display includes a preview image of a printable item (as the printable item would appear in printed form upon selection of the print option), a "print media choice" option, and an "orientation choice" option. Such methods detect user operation of the user input component resizing the preview image within the preview electronic display, in order to identify an updated size of the preview image.

With this, the methods compare the updated size of the preview image to sizes of print media that are available to the printing device, and this allows these methods to match the updated size to one of the sizes of print media and thereby identify a selected print media supply for use with printing the printable item (and such processing is performed automatically using a processor operatively connected to the printing device). For example, the sizes of print media available to a printing device can be the different sizes of print media currently loaded within the printing device, or other sizes capable of being loaded in, or supplied to, the printing device. The process of comparing the updated size of the preview image to the sizes of print media available by the processor determines which of the sizes of print media available most closely matches the aspect ratio of the updated size, and such processing selects one of the sizes of print media available that most closely matches the aspect ratio of the updated size as the selected print media supply.

Similarly, these methods use the processor to automatically compare the updated size of the preview image to orientations the printing device is capable of printing, and this allows the methods to match the updated size to one of the orientations and thereby identify a selected printing orientation for use with printing the printable item. The process of comparing the updated size of the preview image to the orientations the printing device is capable of printing by the processor determines which of the orientations most closely matches the aspect ratio of the updated size, and selects one of the orientations that most closely matches the aspect ratio of the updated size as the selected printing orientation.

Additionally, with such methods, the display device automatically sets the print media choice option to the selected print media supply and sets the orientation choice option to the selected printing orientation within the preview electronic display (and such is done in response to detection of the user input component resizing the preview image). Further, the process of setting the print media choice option to the selected print media supply, and the process of setting the orientation choice option to the selected printing orientation can be performed dynamically by the display device in real time as the user input component detects the user resizing the preview image.

Also, in these methods, the display device can automatically change border areas shown within the preview image in response to the display device setting the print media choice option to the selected print media supply and setting the orientation choice option to the selected printing orientation within the preview electronic display. In addition, the printing device can automatically print the printable item, using the selected print media supply and the selected printing orientation, in response to user selection of the print option.

Various systems/devices herein include (among other components) a processor operatively connected to (meaning directly or indirectly connected to) a display device, a printing device, etc. The display device can include (or be operatively connected to) a user input component, etc., and displays a printing menu. The printing menu includes a preview menu option and a print option. Thus, the display device displays a preview electronic display in response to the preview menu option being selected.

The preview electronic display includes a preview image of a printable item (as the printable item would appear in printed form upon selection of the print option), a print media choice option, and an orientation choice option. The user input component detects the user resizing the preview image within the preview electronic display to identify an updated size of the preview image.

The processor automatically compares the updated size of the preview image to sizes of print media available to the printing device, to match the updated size to one of the sizes of print media, and thereby identify a selected print media supply for use with printing the printable item. By comparing the updated size of the preview image to the sizes of print media available, the processor determines which of the sizes of print media available most closely matches the aspect ratio of the updated size, and therefore selects one of the sizes of print media available that most closely matches the aspect ratio of the updated size as the selected print media supply.

The processor also automatically compares the updated size of the preview image to orientations the printing device is capable of printing, to match the updated size to one of the orientations and thereby identify a selected printing orientation for use with printing the printable item. Similarly, by comparing the updated size of the preview image to the orientations the printing device is capable of printing, the processor determines which of the orientations most closely matches the aspect ratio of the updated size, and selects one of the orientations that most closely matches the aspect ratio of the updated size as the selected printing orientation.

The display device automatically sets the print media choice option to the selected print media supply and sets the orientation choice option to the selected printing orientation within the preview electronic display, in response to the user input component detecting the user resizing the preview image; and this operation can be performed dynamically as the user input component detects the resizing of the preview image. In addition, the display device can automatically change border areas shown within the preview image, in response to the display device setting the print media choice option to the selected print media supply and setting the orientation choice option to the selected printing orientation within the preview electronic display.

Also, the printing device automatically prints the printable item using the selected print media supply and the selected printing orientation, in response to user selection of the print option. These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, trial and error adjustments of size and orientation elements are needed when attempting to improve resized output from within a print menu. In view of this, methods and systems herein provide a dynamic job previewer that allows the user to drag and resize the job preview and the media size and orientation is automatically changed to the closest available fit.

Figure 1:
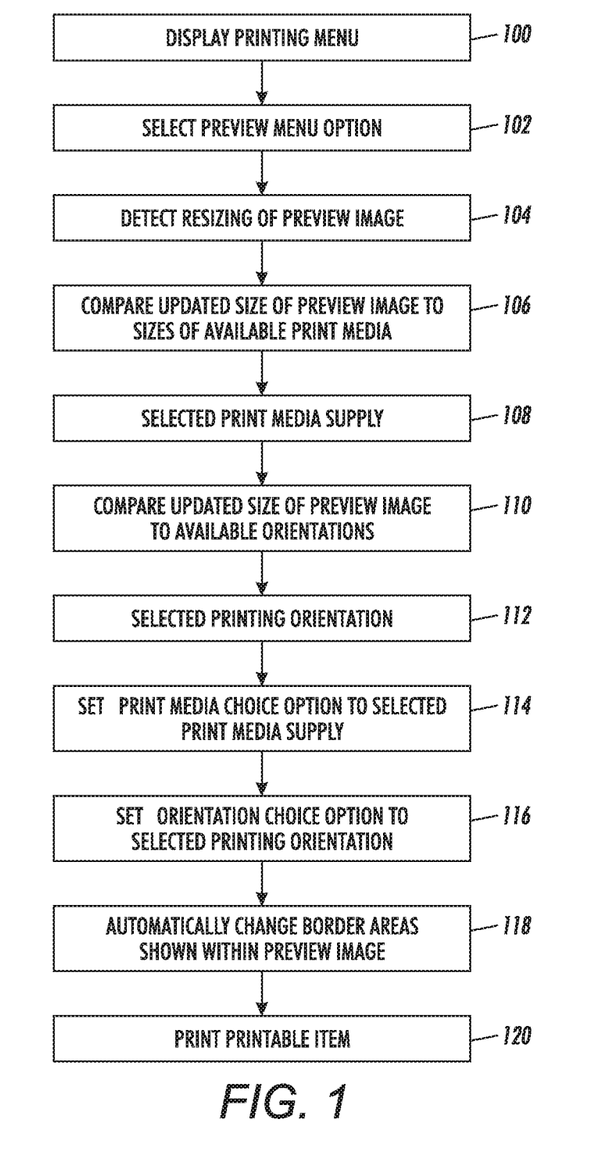
FIG. 1 is a flow diagram of various methods herein.

FIG. 1 is flowchart illustrating exemplary methods herein and is explained with reference to FIGS. 2-6, in the following discussion. These methods provide (from a processor 216, 224 to a display device 212, shown in FIG. 2) a "print-menu" electronic display image 150 related to printing a document, and the display device 212 displays the same, as shown in item 100 in FIG. 1. The display device 212 can be a component of, or connected to, a printer, copier, multi-function device, computer, portable electronic device, etc.; and the document can be a scanned image, a printable document generated by a software application, a printable item retrieved from storage, etc.

Figure 2:
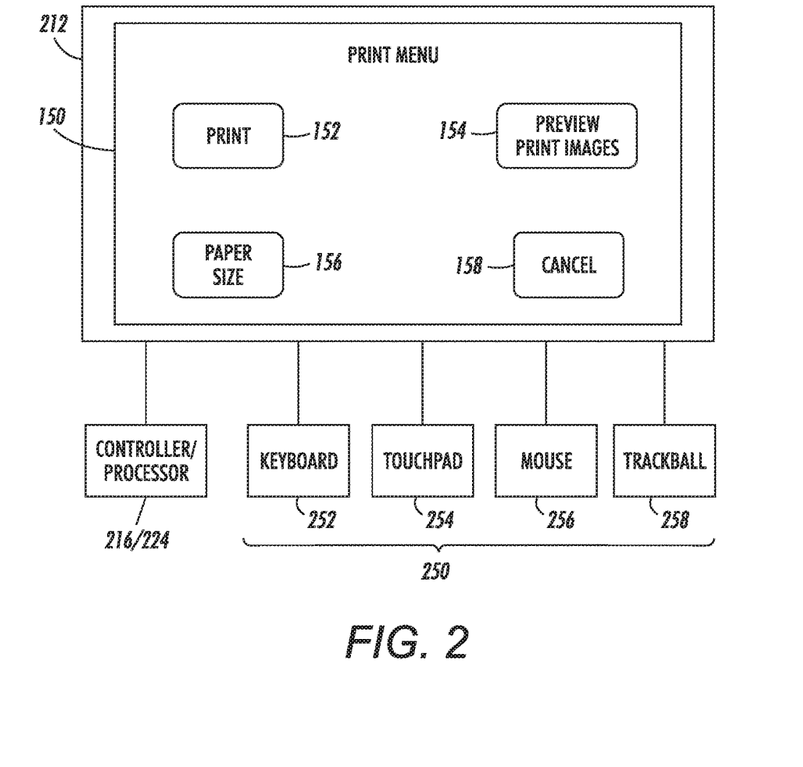
FIG. 2-6 are schematic diagrams illustrating displays herein.

As shown in FIG. 2, the display device 212 includes one or more items that make up a user input component 250 (non-limiting examples of which include, touch screen 212, keyboard 252, touchpad 254, mouse 256, trackball 258, etc., or any similar device) interacting with electronic screens (e.g., 150, 170) displayed on the display device 212. The print-menu electronic display image 150 can include various menu options including (but not limited to) a "print" menu option 152, a "preview" menu option 154, a "paper size" menu option 156, a "cancel" menu option 158, etc. User selection of the preview menu option 154 (through user input to the user input component 250) is shown as item 102 in FIG. 1.

Figure 3:
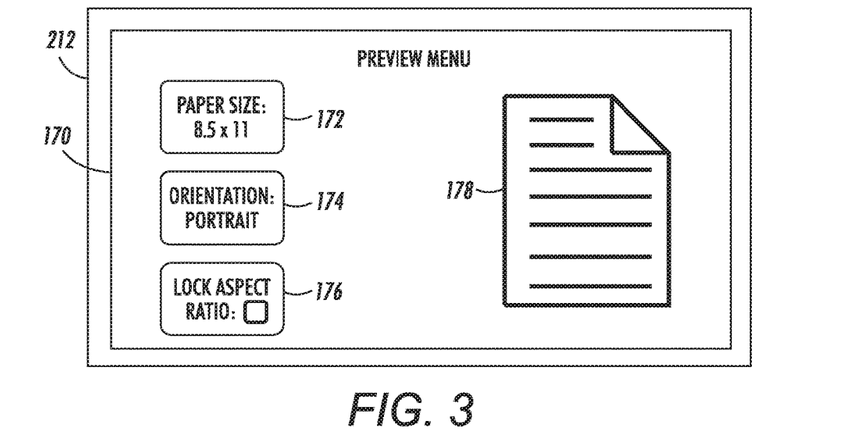

In response to the preview menu option being selected by the user through the user input component, as shown in item 102, these methods display a "preview" electronic display 170 on the display device 212, as shown in FIG. 3. The preview electronic display 170 includes a preview image 178 of a printable item (as the printable item would appear in printed form upon selection of the print option, having an edge, unprinted border between the media edge and the printed image, etc.), a "print media choice" option 172 (e.g., paper size option), an "orientation choice" option 174, and a lock aspect ratio option 176. Further, various instructions or indicators can be provided in guidebooks or on the preview electronic display 170 to indicate that the preview image can be resized by the user, such as shapes or marks on the corners or sides of the preview image 178, all of which are intended by be illustrated by the preview image 178 on the electronic screen 170.

In item 104, such methods detect user operation of the user input component 250 resizing the preview image 178 within the preview electronic display 170, in order to identify an updated size of the preview image 178. This is shown, for example, in FIGS. 4 and 5, where an illustration feature 180 shows the result of user input to the user input component 250 moving a corner of the preview image 178. Illustration feature 180 shows the operation of the user input component 250 as an aid to understanding how the methods and systems herein operate, and is not necessarily an element that appears within the preview electronic display 170 (especially if the user input component 250 is a touch screen display 212). For example, in item 104, the user can hold down a button of the user input component 250 (or keep constant contact with a touch screen 212) while moving a pointing device (or moving the point being contacted on a touch screen 212) to execute a "click-and-drag," "drag-and-drop," or other similar operation, so as to grab (hold) and move one corner or an edge of the preview image 178, as shown by the arrow in FIG. 5.

Figure 4:
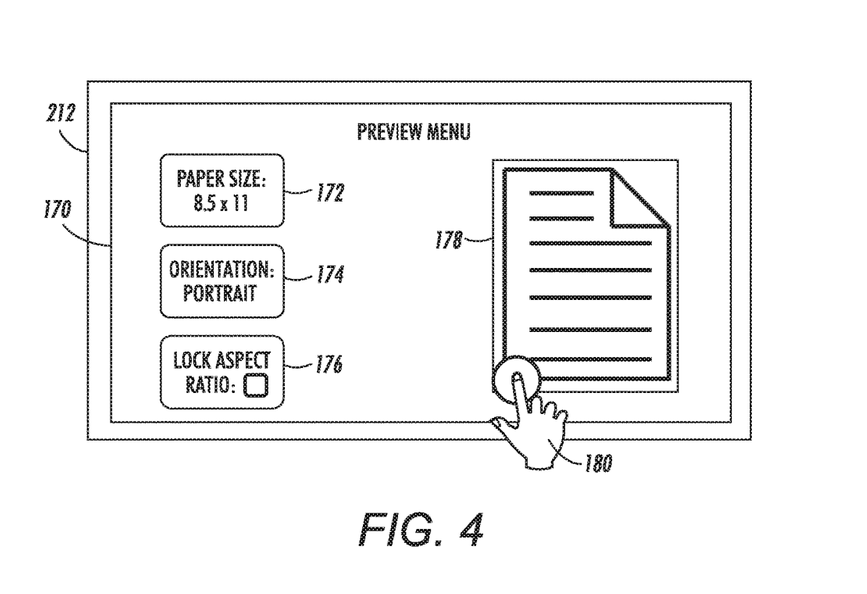
Figure 5:
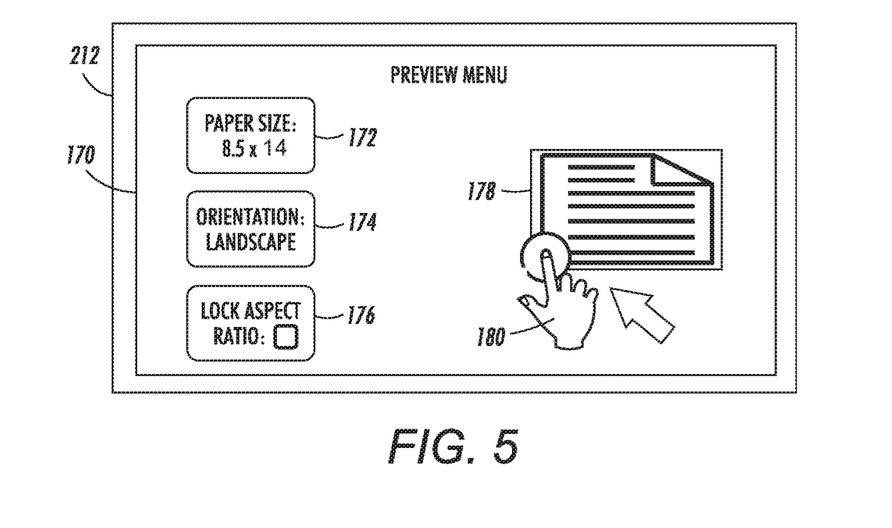

The unaltered size and aspect ratio of the preview image 178 is shown in FIG. 4, while the updated size (and aspect ratio) of the preview image 178 is shown in FIG. 5; and this illustrates the change in size and aspect ratio of the preview image 178 resulting from the click-and-drag operation on a corner of the preview image 178, caused by user operation of the user input component 250, as illustrated by the illustration feature 180 and the block arrow in FIG. 5. The aspect ratio of a thumbnail image is the 2-dimensional ratio of the X-Y sides (e.g., height and width) of the thumbnail image and corresponds to the same for the printed item.

With this, in item 106, the methods compare the updated size of the preview image 178 to sizes of print media that are available to a printing device, and this allows these methods to match the updated size to one of the sizes of print media and thereby identify a selected print media supply (shown as item 108) for use with printing the printable item, (and such processing is performed automatically using a processor operatively connected to the printing device). For example, the sizes of print media available to a printing device are the different sizes of print media currently loaded within the printing device, or other sizes capable of being loaded in, or supplied to, the printing device. The process of comparing the updated size of the preview image 178 to the sizes of print media available by the processor in item 106 determines which of the sizes of print media available most closely matches the aspect ratio of the updated size of the preview image 178, and such processing selects one of the sizes of print media available that most closely matches the aspect ratio of the updated size as the selected print media supply 108.

Similarly, in item 110, these methods use the processor to automatically compare the updated size of the preview image 178 to orientations the printing device is capable of printing, and this allows the methods to match the updated size to one of the orientations and thereby identify a selected printing orientation (shown as item 112) for use with printing the printable item. The process of comparing the updated size of the preview image 178 to the orientations the printing device is capable of printing by the processor in item 110 determines which of the orientations most closely matches the aspect ratio of the updated size, and selects one of the orientations that most closely matches the aspect ratio of the updated size as the selected printing orientation 112.

The size of the print media and the orientation can be matched to the updated size in many different ways. Conceptually, systems and methods herein "most closely" match the media and orientation to the updated size by determining which of the available print sizes and orientations will produce the smallest amount of unprinted border area 182 (see FIG. 6). Therefore, if 8½×11 print media would result in 60% of the sheet being unprinted; however, A4 print media would results in 20% of the sheet being unprinted, A4 print media would most closely match the updated size of the preview image (and such comparisons can be based upon the aspect ratio alone (e.g., based only on the aspect ratio of the preview image 178)).

As additional examples, the updated size and aspect ratio of the preview image 178 can be compared to a lookup table (LUT) to automatically identify the appropriate print media size and orientation (where the lookup table contains columns for ranges of preview image sizes, and ranges of preview image aspect ratios; and columns for specific print media orientation corresponding to such ranges, and columns for print media size corresponding to such ranges, etc.). Alternatively, an optimization process can be utilized that dynamically calculates which available print media size and orientation most closely matches the updated size and aspect ratio of the preview image 178. While some processes for matching the updated size to available in print media sizes and available orientations are discussed here, other similar processes could be utilized by the systems and methods herein, as would be understood by those ordinarily skilled in the art.

Additionally, with such methods, the display device 212 automatically sets the print media choice option 172 to the selected print media supply in item 114 (without any additional user input). Further, methods herein set the orientation choice option 174 to the selected printing orientation within the preview electronic display 170 in item 116 (without any additional user input). Further, such processes (114, 116) are performed in response to detection of (and during) the user input component 250 resizing the preview image 178.

Thus, as can be seen by comparing FIGS. 4 and 5, the print media choice option 172 automatically changes from paper size 8½×11 in FIG. 4, to 8½×14 in FIG. 5, and the orientation option 174 automatically changes from portrait in FIG. 4, to landscape in FIG. 5. Again, these changes are automatically made by the display device 212 (following instructions from the processor 216/224) based on the user operation of the user input component 250 creating the updated size of the preview image 178, and are performed without any additional user input other than the uses resizing the preview image 178. Further, the process of setting the print media choice option 172 to the selected print media supply in item 114, and the process of setting the orientation choice option 174 to the selected printing orientation in item 116 can be performed dynamically by the display device 212 in real time as the user input component 250 detects the user resizing the preview image 178.

Thus, the automatic changes to the print media choice option 172 and orientation choice option 174 can be made even before the user releases the button (or screen contact) used in the click-and-drag operation. Therefore, as the user is in the process of resizing the preview image in item 104, the processing in items 106-116 simultaneously and continuously occurs, so that the print media choice option 172 and orientation choice option 174 change while the user is resizing the preview image (simultaneously with (at the same time) the user resizing the preview image). Because the print media choice option 172 and orientation choice option 174 change while the user is resizing the preview image, the user can immediately see how their click-and-drag changes to the size of the preview image 178 produces changes to the print media choice option 172 and orientation choice option 174, in real time as the preview image resizing is occurring.

Figure 6:
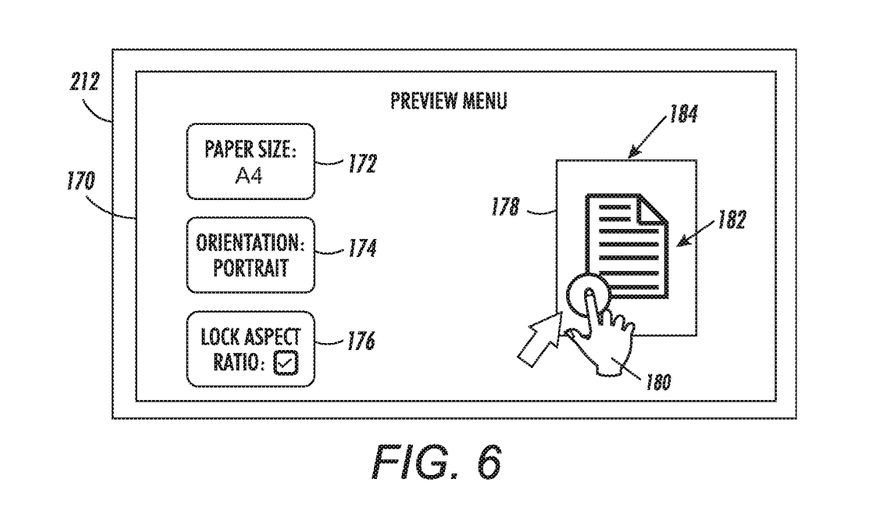

In FIGS. 4 and 5, the lock aspect ratio option 176 is unchecked, which allows the aspect ratio of the preview image 178 to change as a side or corner of the preview image 178 is moved through the user input component 250. FIG. 6 illustrates the situation where the lock aspect ratio option 176 is checked, preventing the aspect ratio of the preview image 178 from changing as a side or corner of the preview image 178 is moved through the user input component 250. In such situations, the display device 212 automatically changes border areas 182 shown within the preview image 178 in item 118, in response to the display device 212 setting the print media choice option 172 to the selected print media supply and setting the orientation choice option 174 to the selected printing orientation within the preview electronic display 170. In FIG. 6, the simulated edge of the printed sheet of the preview image 178 is shown using numeral 184. Note that by comparing FIG. 4 to FIG. 6, it can be seen that the systems and methods herein automatically change the paper size from 8½×11 in FIG. 4, to A4 in FIG. 6; however, the orientation option 174 is not changed from portrait in FIG. 6.

In addition, the printing device automatically prints the printable item in item 120, using the selected print media supply and the selected printing orientation, in response to user selection of the print option.

The hardware described herein plays a significant part in permitting the foregoing method to be performed, rather than function solely as a mechanism for permitting a solution to be achieved more quickly, (i.e., through the utilization of a computer for performing calculations).

As would be understood by one ordinarily skilled in the art, the processes described herein cannot be performed by a human alone (or one operating with a pen and a pad of paper) and instead such processes can only be performed by a machine (especially when the electronic display, automated processing, and altering of page size within an electronic document is considered). Specifically, processes such as displaying electronic data streams, altering electronic items that are being displayed, using scanners, printers, and display devices, etc., requires the utilization of different specialized machines, and humans cannot perform such processing without machines. Further, such machine-only processes are not mere "post-solution activity" because the methods herein involve electronic graphic user interface interaction. In other words, these various machines are integral with the methods herein because the methods cannot be performed without the machines (and cannot be performed by humans alone).

Additionally, the methods herein solve many highly complex technological problems. For example, as mentioned above, users are often confused about how to resize pages within an electronic document, or frustrated or make errors when attempting to do so. Methods herein solve this technological problem by automatically changing size and orientation options while the user resizes a preview image, using helpful and graphically driven display interactive tools. Because the print media choice option and orientation choice option change while the user is resizing the preview image, the user can immediately see how their click-anddrag changes to the size of the preview image produces changes to the print media choice option and orientation choice option in real time. This reduces the amount of mistakes a user may generate when resizing pages, and increases user satisfaction by simplifying the process for the user. By granting such benefits, the methods herein reduce the amount of errors generated, thereby solving a substantial technological problem that providers experience today.

Figure 7:
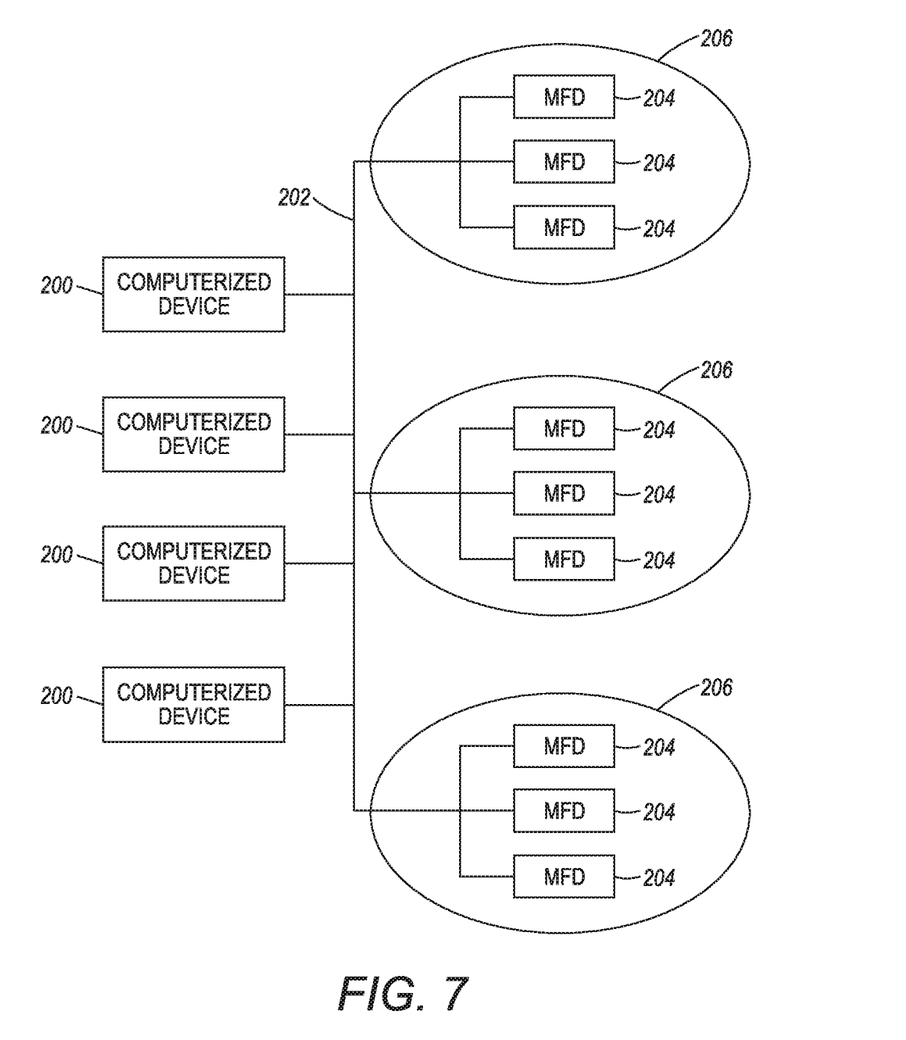
FIG. 7 is a schematic diagram illustrating systems herein.

As shown in FIG. 7, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 8:
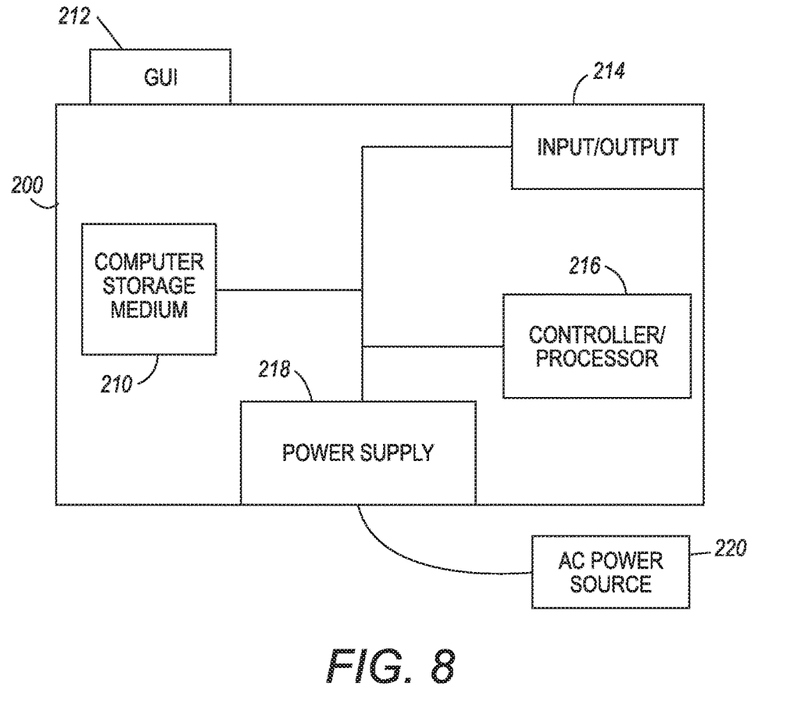
FIGS. 8-9 are schematic diagrams illustrating devices herein.

FIG. 8 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 8, a body housing has one or more functional components that operate on power supplied from an alternating current (AC) source 220 by the power supply 218. The power supply 218 can comprise a common power conversion unit, power storage element (e.g., a battery, etc), etc.

Figure 9:
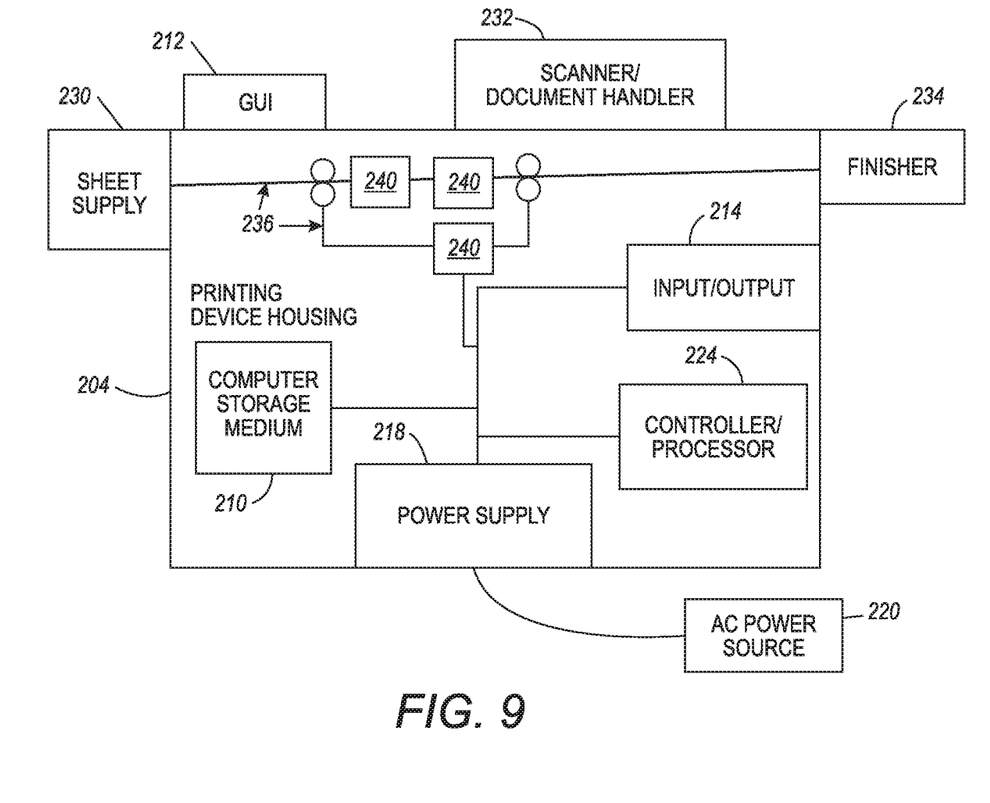

FIG. 9 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

As would be understood by those ordinarily skilled in the art, the printing device 204 shown in FIG. 9 is only one example and the systems and methods herein are equally applicable to other types of printing devices that may include fewer components or more components. For example, while a limited number of printing engines and paper paths are illustrated in FIG. 9, those ordinarily skilled in the art would understand that many more paper paths and additional printing engines could be included within any printing device used with systems and methods herein.

Therefore, as shown above, various systems/devices herein include (among other components) a processor 216, 224 operatively connected to (meaning directly or indirectly connected to) a display device 212, a printing device 204, etc. The display device 212 can include (or be operatively connected to) a user input component 250, etc., and displays a printing menu. The printing menu includes a preview menu option and a print option. Thus, the display device 212 displays a preview electronic display in response to the preview menu option being selected.

The preview electronic display includes a preview image of a printable item (as the printable item would appear in printed form upon selection of the print option), a print media choice option, and an orientation choice option. The user input component 250 detects the user resizing the preview image within the preview electronic display to identify an updated size of the preview image.

The processor 216, 224 automatically compares the updated size of the preview image to sizes of print media available to the printing device 204, to match the updated size to one of the sizes of print media, and thereby identify a selected print media supply for use with printing the printable item. By comparing the updated size of the preview image to the sizes of print media available, the processor 216, 224 determines which of the sizes of print media available most closely matches the aspect ratio of the updated size, and therefore selects one of the sizes of print media available that most closely matches the aspect ratio of the updated size as the selected print media supply.

The processor 216, 224 also automatically compares the updated size of the preview image to orientations the printing device 204 is capable of printing, to match the updated size to one of the orientations and thereby identify a selected printing orientation for use with printing the printable item. Similarly, by compare the updated size of the preview image to the orientations the printing device 204 is capable of printing, the processor 216, 224 determines which of the orientations most closely matches the aspect ratio of the updated size, and selects one of the orientations that most closely matches the aspect ratio of the updated size as the selected printing orientation.

The display device 212 automatically sets the print media choice option to the selected print media supply and sets the orientation choice option to the selected printing orientation within the preview electronic display, in response to the user input component 250 detecting the user resizing the preview image; and this operation can be performed dynamically as the user input component 250 detects the resizing of the preview image. In addition, the display device 212 can automatically change border areas shown within the preview image, in response to the display device 212 setting the print media choice option to the selected print media supply and setting the orientation choice option to the selected printing orientation within the preview electronic display.

Also, the printing device 204 automatically prints the printable item using the selected print media supply and the selected printing orientation, in response to user selection of the print option.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user); one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
    displaying a preview electronic display on a display device, said display device includes a user input component, and said preview electronic display includes a preview image of a printable item as said printable item would appear in printed form, a print media choice option, and an orientation choice option;
    detecting operation of a user input component resizing said preview image within said preview electronic display to identify an updated size of said preview image;
    matching said updated size of said preview image to a most closely matching size of print media currently loaded within a printing device to identify a selected print media supply for use with printing said printable item, said printing device is operatively connected to said display device, and said matching to said most closely matching size is performed automatically using a processor operatively connected to said printing device by said processor determining which of said print media currently loaded produces a smallest amount of unprinted border area when printing said printable item;
    matching said updated size of said preview image to orientations, said printing device is capable of printing to identify a selected printing orientation for use with printing said printable item, using said processor; and
    automatically, by said display device, setting said print media choice option to said selected print media supply and setting said orientation choice option to said selected printing orientation within said preview electronic display, in response to said detecting operation of said user input component resizing said preview image.

2. The method according to claim 1, said matching said updated size of said preview image to said orientations, said printing device is capable of printing by said processor, determines which of said orientations most closely matches an aspect ratio of said updated size, and selects one of said orientations that most closely matches said aspect ratio of said updated size as said selected printing orientation.

3. The method according to claim 1, said setting said print media choice option to said selected print media supply and setting said orientation choice option to said selected printing orientation is performed dynamically by said display device as said user input component detects said resizing of said preview image.

4. The method according to claim 1, further comprising automatically, by said display device, changing border areas shown within said preview image in response to said display device setting said print media choice option to said selected print media supply and setting said orientation choice option to said selected printing orientation within said preview electronic display.

5. The method according to claim 1, further comprising automatically, by said display device, selectively locking an aspect ratio of said preview image during said resizing said preview image based on whether a lock aspect ratio option is selected.

6. A method comprising:
    displaying a printing menu on a display device, said display device includes a user input component, said printing menu includes a preview menu option and a print option;
    displaying a preview electronic display on said display device in response to said preview menu option being selected through said user input component, said preview electronic display includes a preview image of a printable item as said printable item would appear in printed form upon selection of said print option, a print media choice option, and an orientation choice option;

detecting operation of said user input component resizing said preview image within said preview electronic display to identify an updated size of said preview image;

comparing said updated size of said preview image to sizes of print media currently loaded within a printing device to match said updated size to a most closely matching size of said print media currently loaded and identify a selected print media supply for use with printing said printable item, said printing device is operatively connected to said displayed device, and said comparing to match said updated size to said most closely matching size is performed automatically by using a processor operatively connected to said printing device by said processor determining which of said print media currently loaded produces a smallest amount of unprinted border area when printing said printable item;

comparing said updated size of said preview image to orientations, said printing device is capable of printing to match said updated size to one of said orientations and identify a selected printing orientation for use with printing said printable item, using said processor; and automatically, by said display device, setting said print media choice option to said selected print media supply and setting said orientation choice option to said selected printing orientation within said preview electronic display, in response to said detecting operation of said user input component resizing said preview image.

7. The method according to claim 6, said comparing said updated size of said preview image to said orientations, said printing device is capable of printing by said processor, determines which of said orientations most closely matches an aspect ratio of said updated size, and selects one of said orientations that most closely matches said aspect ratio of said updated size as said selected printing orientation.

8. The method according to claim 6, said setting said print media choice option to said selected print media supply and setting said orientation choice option to said selected printing orientation is performed dynamically by said display device as said user input component detects said resizing of said preview image.

9. The method according to claim 6, further comprising automatically, by said display device, changing border areas shown within said preview image in response to said display device setting said print media choice option to said selected print media supply and setting said orientation choice option to said selected printing orientation within said preview electronic display.

10. The method according to claim 6, further comprising automatically, by said display device, selectively locking an aspect ratio of said preview image during said resizing said preview image based on whether a lock aspect ratio option is selected.

11. A system comprising:
a processor,
a display device operatively connected to said processor, said display device includes a user input component, and
a printing device operatively connected to said processor,
said display device displays a printing menu,
said printing menu includes a preview menu option and a print option,
said display device displays a preview electronic display in response to said preview menu option being selected through said user input component,
said preview electronic display includes a preview image of a printable item as said printable item would appear in printed form upon selection of said print option, a print media choice option, and an orientation choice option,
said user input component detects resizing of said preview image within said preview electronic display to identify an updated size of said preview image,
said processor automatically compares said updated size of said preview image to sizes of print media currently loaded within said printing device to match said updated size to a most closely matching size of said print media currently loaded and identify a selected print media supply for use with printing said printable item by said processor, determining which of said print media currently loaded produces a smallest amount of unprinted border area when printing said printable item,
said processor automatically compares said updated size of said preview image to orientations, said printing device is capable of printing to match said updated size to one of said orientations and identify a selected printing orientation for use with printing said printable item, and
said display device automatically sets said print media choice option to said selected print media supply and sets said orientation choice option to said selected printing orientation within said preview electronic display, in response to said user input component detecting said resizing of said preview image.

12. The system according to claim 11, by comparing said updated size of said preview image to said orientations, said printing device is capable of printing, said processor determines which of said orientations most closely matches an aspect ratio of said updated size, and selects one of said orientations that most closely matches said aspect ratio of said updated size as said selected printing orientation.

13. The system according to claim 11, said display device dynamically sets said print media choice option to said selected print media supply and dynamically sets said orientation choice option to said selected printing orientation as said user input component detects said resizing of said preview image.

14. The system according to claim 11, said display device automatically changes border areas shown within said preview image in response to said display device setting said print media choice option to said selected print media supply and setting said orientation choice option to said selected printing orientation within said preview electronic display.

15. The system according to claim 11, said display device selectively locks an aspect ratio of said preview image during said resizing of said preview image based on whether a lock aspect ratio option is selected.

* * * * *